Oct. 26, 1943.     C. V. SMITH     2,332,674
METHOD OF AND MEANS FOR FORMING UNBREAKABLE LENSES
Filed Aug. 12, 1940
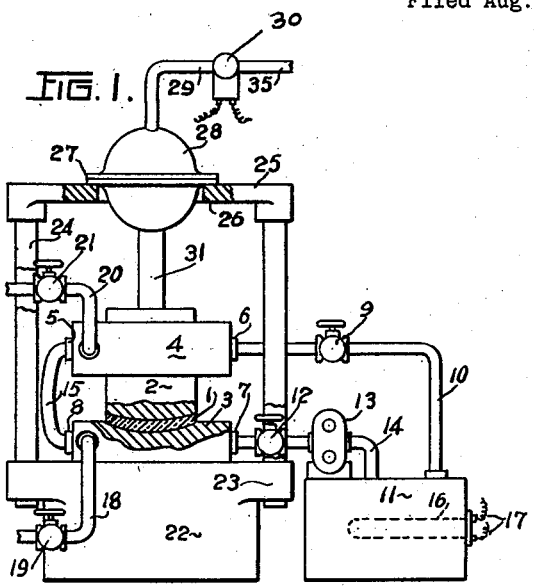
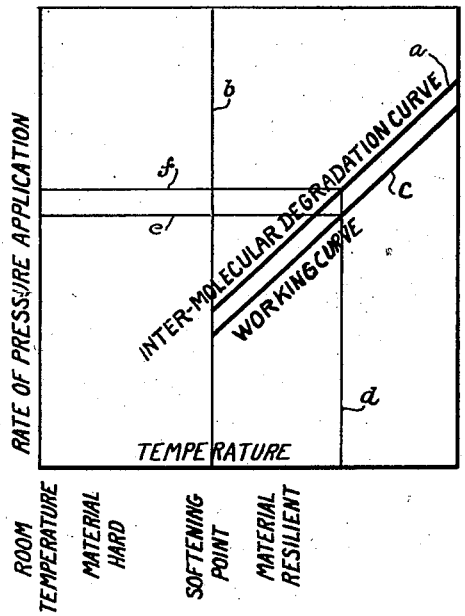
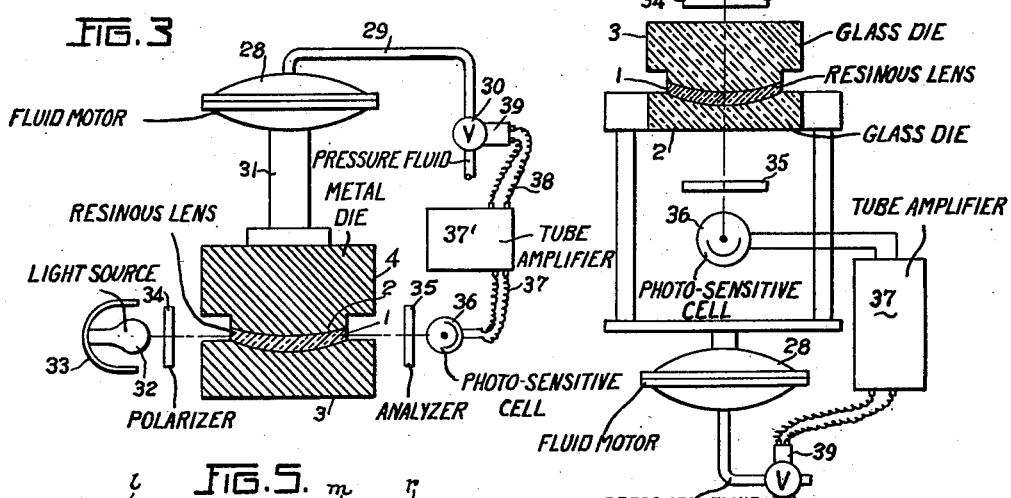
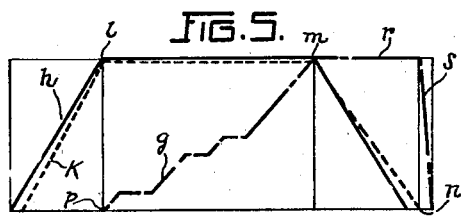
CHARLES V. SMITH, Patented Oct. 26, 1943

2,332,674

UNITED STATES PATENT OFFICE 2,332,674

METHOD OF AND MEANS FOR FORMING UNBREAKABLE LENSES

Charles V. Smith, Dayton, Ohio, assignor to The Univis Lens Company, Dayton, Ohio, a corporation of Ohio Application August 12, 1940, Serial No. 352,229

14 Claims. (Cl. 18—17)

The present invention relates to the manufacture of optical lenses, and more particularly to the formation of such lenses from non-breakable material.

Certain forms of plastic material have heretofore been employed in the fabrication of unbreakable eyeglass lenses. In general, the mode of procedure includes the introduction of a sheet of organic resin such as "Plexiglas," which is in substance a polymerized derivative of acrylic acid, between a pair of glass dies which are ground to form dioptric surfaces and heated in any suitable manner. When the proper pressure and temperature are applied to the dies the curvatures of the latter are transferred perfectly to the lens, which comes out with optically smooth surfaces. The edges of the dies are left open to provide for expansion of the material, and after being formed the surplus material around the edges of the lens is removed in any suitable and well known manner. While the process referred to hereinbefore gives satisfactory results when strict adherence to the temperature and pressure schedule is kept, it has been found that slight deviations from this schedule may deleteriously affect the refractive index of the lens, also reduce hardness and cause "crazing." These errors may cause so-called "bi-refringence" and fuzziness of image when the material is used as a spectacle lens.

I have discovered, in accordance with my invention, that the change in the light transmission properties of the lens under these conditions is due to slight strains or stresses introduced into the lens during the pressing operation. These changes are brought about by a rearrangement or slight "give" of the chain of molecules which constitutes the chemical polymers of the material by strain or stress, either due to excessive pressure for a given temperature of the mass or due to improper heating or cooling for a given pressure. These strains are not entirely unlike those introduced into glass under the same conditions, but yet are of a somewhat different kind in that for a given stress, the strain in the resinous material may render the material absolutely useless for optical purposes, whereas, the same amount of stress does not produce a deleterious optical strain in glass.

It will be understood that there is an optimum relation between the pressure and the rate at which heat is applied to or withdrawn from a mass of plastic material, depending on the character of the material and its use. In general the higher the applied temperature the faster may the pressure be applied and the greater the maximum limit of pressure without introducing deleterious strains, but the relation between specific temperatures and pressures varies with the character of the material and the range of temperature or pressure. Consequently, it is difficult to predict and even harder to control the proper relation between all of these factors in the manufacture of optical lenses which require precise accuracy of refraction.

The primary object of this invention is to provide an improved process by which lenses of non-breakable plastic material may be formed in quantity production, and offering absolute assurance that no strain greater than the permissible strain will be introduced into the formed lens which might deleteriously affect its optical properties.

Another object is to provide a method and apparatus by which strain or stress is immediately detected during the forming of the lens, and suitable correction is instantly and automatically made in the process to relieve the strains or stresses.

Another object is to provide an improved process and machine, including a photoelectric tube control circuit for determining the presence of the slightest strain or stress in the material while being formed, and to make suitable adjustment in the applied forming pressures in order to relieve the excessive stress or strain.

In brief, my improved technique is based on the discovery of the fact that every form of transparent plastic resin exhibits a characteristic curve found by experiment, which determines the rate at which pressure may be applied to the material for the various temperatures without introducing the slightest stress or strain into the material. Accordingly, if the rate of applied pressure for a given temperature is less than the safe rate as established by the characteristic, no strains or stresses will be introduced and the material of the formed lens will retain essentially its original index of refraction and the true power of the lens will be determined by the shape of the dies. Morover, a lens made in this manner will maintain these optical properties over long periods of time.

In accordance with another feature of my invention there is provided a strain-detecting apparatus employing polarized light which is caused to pass through the material and to impinge on a photoelectric tube which effects a control of the pressure being momentarily applied.

Other objects and features will be apparent as the specification is perused in connection with the drawings.

In the drawings:

Figure 1 is a diagrammatic view, partly in section, of a typical form of die press, including an oil heating and cooling accessory which may be employed in connection with my invention.

Figure 2 is a diagram showing a pair of characteristic curves indicated as straight lines drawn against temperatures as abscissae and rate of pressure application as ordinate.

Figure 3 is a fragmentary view of the apparatus illustrated in Figure 1, but showing the application thereto of my improved strain-detecting circuit and control apparatus therefor. In Figure 3 the pressing dies are made of metal, necessitating the light to be transmitted through the plastic material from left to right.

Figure 4 is a view somewhat similar to Figure 3, except for the position of the fluid motor and the fact that the dies are made of glass, thus permitting the light to be passed not only through the plastic material but also through the dies.

Figure 5 is a diagram showing the variations of temperature and pressure drawn as ordinates, with intervals of time plotted as abscissa.

Referring more particularly to Figures 1 and 3, the lens 1 is constituted of an organic resin, preferably of the acrylate group, and is produced by the polymerization of the monomeric derivatives of acrylic and methacrylic acids or various copolymer materials developed to have controlled optical properties, such as the styrenes. Such material may be sold under the trade names of "Plexiglas," "Lucite," "Crystalite" and "Acryloid." These acryloids are thermo-plastic and lend themselves readily to production for molding powders for both compression and injection molding. The material when formed into a piece of the thickness of an ordinary eyeglass lens, such as spectacle, microscope, camera or telescope lens, is for all practical purposes entirely unbreakable. It is highly transparent, its light transmission being superior to the best optical glass, even greater than ninety-five per cent. The index of refraction of the material is 1.4 to 1.7, thus differing but little from the index of optical glass. The material becomes sufficiently plastic to be worked or bent at approximately ninety degrees C.

On each side of the lens 1 there is a die member 2, 3 made of metal or glass, and having a hard smooth surface formed with optically perfect curves. The upper die member is provided with an enlarged portion 4, honeycombed with a series of intercommunicating passageways (not shown), with an inlet indicated at 5 and an outlet 6. The lower die 3 is similarly provided with intercommunicating passageways (not shown), which have an inlet indicated at 7 and an outlet 8. The outlet 6 of the upper die portion is connected through a shut-off valve 9 and a conduit 10 to a tank 11 containing a heat-transferring fluid such as oil (not shown). The inlet 7 of the lower die 3 is connected through a shut-off valve 12 to a pump 13, and thence to the tank 11 through a conduit 14. The outlet 8 of the lower die member is connected to the inlet 5 of the upper die member through a pipe 15.

The pump 13 may be of any suitable and well known type, its function being simply to pump the fluid contained in the tank 11 up through the pipe 14, thence through the passageways in the lower die 3, thence through the pipe 15 and through the enlarged portion 4 of the upper die, and finally through the pipe 10 back to the tank. The latter is provided with a heater of any suitable form, which has been typically illustrated as an electric resistance 16 which is energized through the wires 17.

In addition to the conduit system described above, there is a pipe 18 entering the passageways in the lower die member 3 through a valve 19 for carrying cooling fluid through the die, and controlled at the valve 19, this cooling fluid passing through the conduit 15 and through the passageways in the enlarged portion 4 of the upper die, and out of the system through the conduit 20 and the valve 21. The arrangement is such that when it is desired to heat up the dies the valves 19 and 21 of the cooling fluid system are shut off, and valves 9 and 12 are opened to permit heated fluid to pass up from the tank 11, through the pump 13, and through both dies, back to the tank through the conduit 10. When it is desired to cool the conduits the valves 9 and 12 are closed and the valves 19 and 21 are opened, thus permitting cooling fluid, which also is preferably oil, to pass through the conduit 18 to circulate through the passageways in the lower die 3, thence through the conduit 15 and to circulate through the upper die portion 4, and finally out through the conduit 20 past the valve 21. This fluid may either be maintained at room temperature or even chilled, if necessary, in any suitable and well known manner.

The die 3 rests on a heavy block of metal 22, which constitutes the bed of a press mechanism. The block is provided with four ears or projections 23 arranged at the corners which support the uprights 24, carrying at their tops a horizontal plate 25 which is apertured as indicated at 26. The plate 25 serves as a support for the flanged portion 27 of a fluid motor 28, of any suitable and well known design, but preferably of the diaphragm type. Such a motor comprises upper and lower hemispherical casings with a diaphragm diametrically positioned across the casings. The upper casing is provided with compressed air or oil under considerable pressure through a conduit 29, and controlled by a valve 30. The lower hemispherical portion includes a piston (not shown) which is mechanically connected to a piston rod 31, and the latter is secured to the enlarged portion 4 of the upper die member.

Assuming that there is an incompressible fluid within the lower casing and contained between the diaphragm and the piston, the diaphragm is caused to flex when fluid under pressure is admitted to the conduit 29 through the valve 30. This flexing action causes the piston to be forced downwardly and to compress the two die members together, producing a squeezing action at the resinous material 1. This material is presented to the dies as having a size slightly larger all around than the dimensions of the final lens and as originally having a uniform thickness and preferably, though not necessarily, being initially substantially flat. Before pressure is exerted on the lens blank the temperature of the dies is brought up to approximately 300 degrees F., or higher, by pumping oil through the die passageways and regulating the temperature of the oil at the heater 16. It is desirable that the dies be in light contact with the lens 1 during this heating-up process so as to transmit the heat of the dies conductively to the lens blank. As the temperature of the dies increases and reaches a value at which the resinous material becomes plastic, pressure is gradually applied to the dies by the fluid motor 28, as described hereinbefore.

I have discovered, in accordance with my invention, that the rate at which pressure is applied under these circumstances is highly critical and is a function not only of the temperature to which the lens blank has been raised by the heated dies but also of the character of the resinous material forming the blank. If this pressure is applied at an excessive rate so that the elastic limit is exceeded for the given temperature certain physical changes will take place in the structure of the resin which introduce stress and accompanying strains, which while not sufficiently severe to cause cracking of the material will nevertheless render the material entirely useless for optical purposes.

As a result of many experiments based on this discovery I have found that every resin of the acrylic type exhibits a characteristic curve which may be plotted against rate of pressure application and temperature, which curve represents the limit above which the rate of pressure cannot be increased for a given temperature if these optically deleterious strains are to be completely avoided. Such a curve has been indicated by the character $a$ in Figure 2. It will be noted that this curve begins at a line marked $b$, which represents the softening point temperature of the particular resin because obviously the resin has very little plastic flow until it has reached the softening point. It has been found that when the rate of pressure is so great that the abscissa corresponding to that pressure intercepts the ordinate representing the temperature to which the resin has been heated at a position above the curve or line $a$, strains are introduced into the material which seriously affect its optical properties even though it may not be noticeable from the physical standpoint, i. e. its susceptibility to fracture.

It will be understood that the acrylate resins are normally unbreakable unless excessive stresses are imparted to the molecular structure. These optical stresses or strains are usually considerably less than those which induce breakage. These optical strains are believed to be caused by a slight change in the arrangement of the chain of molecules which make up the polymers of the resinous material, and resulting from working the material beyond the elastic limit, assuming the latter to be maintained at a constant temperature during imposition of the excessive stresses. In other words, if the pressure utilized to deform the material is greater than the limiting pressure as determined by the characteristic curve $a$ for a given temperature of the material, the molecular structure will be disrupted so that as the pressure is released the material will not come back to its original shape. On the other hand, if the rate of applying pressure is less than the limiting rate for the given temperature the material will resume substantially its original shape when the pressure is withdrawn with the material maintained at the same temperature. The line $a$ in Figure 2 has therefore been designated "Intermolecular degradation curve," meaning that when the rate of applied pressure is less than the limiting rate, as defined by this curve, the plastic material has flowed to form a new shape as determined by the shape of the die without any irreversible or nonelastic change between the molecules of the structure.

In furthering my invention I propose to draw a characteristic curve, which on Figure 2 has been labeled $c$, parallel to the Inter-molecular degradation curve but slightly below the latter. It is my purpose to apply the pressure to the resinous material 1 at the dies 2, 3 at such a rate that the pressure ordinate $d$ will intercept with the temperature abscissa $e$ at the line $c$, and therefore at a predetermined distance below the limiting curve $a$. This has been indicated on Figure 2 by the limiting abscissa $f$ and the permissible abscissa $e$, one of which intercepts the curve $a$ and the other the curve $c$. The latter has been designated on the figure as a so-called "Working curve," meaning that this is a curve beyond which the resinous material should not be worked in terms of applied pressure for a given temperature.

In accordance with the principles of my invention, I have found that in order to produce a lens of resinous material without the stress which disqualifies it from the optical field the rate at which the pressure is continuously applied should be less than a predetermined rate, and if this permissible rate is momentarily exceeded, then the pressure should be applied during alternate application and dwell periods. These alternate pressure application and dwell periods serve a very useful function in that they permit a speeding-up of the lens fabrication process. The dwell periods are determined automatically by an improved method and apparatus, which will be described presently, and the purpose is to permit the molecules which may have been temporarily dislocated to readjust their position within the internal structure, and thus prevent deleterious strains considered from the optical standpoint. These dwell periods are indicated by the irregular dot-dash line $g$ in Figure 5. The ordinates of the graph represent temperature, the temperature of the dies 2, 3 being indicated by the full line $h$, and the temperature of the plastic material being indicated by the dotted line $k$. It will be noted that the line $h$ is drawn somewhat above the line $k$ to indicate that the dies are at slightly higher temperature than the material 1. However, both the dies and the material reach substantially the same elevated temperature at the point marked $l$, and they are maintained at this temperature over a time period indicated by the distance between $l$ and $m$.

It will be understood that the heated oil is caused to flow through the dies to raise their temperature from that of the room to the elevated temperature indicated at $l$, and to maintain this temperature until the point $m$ is reached. At this point the passage of heated oil through the dies is stopped by closing the valves 9, 12 and shutting down the pump 13. The dies and the interposed lens are then cooled by admitting the cool or chilled oil through the pipe 18 into the die passageways, and out through the pipe 20, assuming that the valves 19 and 21 are now opened. The cooling effect thus obtained is shown by the lines which descend from the point $m$ to the point $n$ in Figure 5, the full line $h$ indicating the temperature decrease of the dies falling faster than the dotted line $k$ which is the temperature of the material 1, but both reaching room temperature.

As stated hereinbefore, if the safe rate is exceeded, it is desirable to apply the pressure in intermittent stages, with dwell periods in between, as indicated by the line $g$. This pressure line starts to slope upwardly from the point $p$, at which the pressure is initially applied when the plastic material has reached its maximum temperature and is in a softened state. In order to provide for the proper dwells in terms of duration and position of dwell, I employ an apparatus which automatically controls the pressure valve 30. This apparatus consists essentially of a light source with a back reflector 33 mounted to one side of the dies 2, 3, in case the latter are made out of metal as indicated in Figure 3. Interposed between the lamp 32 and the lens material I there is a plate of polarizing material 34 of any suitable and well known character. On the opposite side of the dies from the lamp there is a transparent sheet 35 of a material which serves to analyze the polarized light transmitted by the element 34, as is well known in the art. It will be understood that the light passes through the resinous material I and through the analyzer, and is caused to impinge on a photo-sensitive device 36 which is illustrated as a photoelectric tube. This tube is connected through the wires 37 preferably to a tube amplifier 37', of any suitable number of stages, and the output of the last stage is electrically connected through the wires 38 to an electro-responsive device 39 located at the valve 30 and adapted to operate said valve when energized.

I have found, in accordance with my invention, that when polarized light is passed through the polarizer 34 and the slightest amount of stress is set up in the resinous material I which would normally be sufficient to render this material useless from the optical standpoint, the light reaching the analyzer 35 is considerably altered. The alteration in light reaching the light-sensitive device and the connections with respect to the amplifier are such as to decrease the current passing through the wires 38 to the electro-responsive device 39. The electrical relation between the light-sensitive device 36 and the tube amplifier 37' to bring about these conditions is well understood in the art. In case the device 36 is a photoelectric tube, a diminution of the impinging light on the cathode will cause the latter to become more positive and the anode to become more negative, and these impulses can be so applied to the grid of the first stage of the tube amplifier as to increase the impedance of that stage and thus reduce the current passing through the wires 38.

The electro-responsive device 39 is so arranged that upon a decrease in current the valve 30 is closed, preferably to a degree corresponding to the amount of decrease in current passing through the wires 38, thus to control the quantity and pressure of the fluid applied to the motor 28. The preferred adjustment is such that when stresses of this character are set up within the resinous material I the light-sensitive device so controls the valve 30 as simply to maintain the pressure within the motor 28, without increasing the fluid pressure. Thus a pressure dwell is caused in the pressure characteristic g (Figure 5).

Pressure is first increased up to a point where optimetrical stresses are set up in the resin, and immediately these stresses are detected by the light-sensitive device the pressure is no longer increased but maintained at this level until the stress-detecting apparatus registers the absence of all stress, at which time the pressure is again increased until the resultant stresses cause the valve 30 to be closed. This operation is repeated over the whole period of time during which the dies and the interposed lens blank are maintained at the maximum elevated temperature. When the point m is reached (Figure 5) at which the dies and the resinous material are started to be cooled, the pressure is no longer increased but is maintained at the maximum value reached during the entire cooling period, as indicated by the line r, after which the pressure is entirely released, as indicated by the line s.

The cooled lens after subjection to this treatment is removed from the press and is found to be entirely free from even the slightest amount of internal stress or strain, including all of those stresses which affect the optical properties of the material and the considerably larger stresses which tend to cause the lens to warp, or in an extreme case to break. The surfaces of the lens are optically true and smooth, and insofar as optical characteristics are concerned the lens compares with a well ground glass lens.

While I have described the operation of the light-sensitive device as producing pressure dwell periods during the time that the lens material is at its maximum temperature and in a plastic condition, it is apparent that the device may be additionally arranged in such a manner as to regulate the pressure applied to the dies 2, 3 during the cooling period. I have found that no stress is normally introduced into the plastic material while maintaining the pressure on the dies at the maximum constant level but with certain types of resin, and particularly when using blanks of considerable thickness, it may be desirable to either increase or decrease the pressure during the cooling period. In such case the light-sensitive device would operate through the tube amplifier and the valve 30 to control the rate of increase or decrease in pressure, dependent on the presence or absence of optimetrical stresses within the resinous material.

It is apparent that the light transmission system, including the lamp 33 and its polarizer and analyzer accessories, also the electrical system including the light-sensitive device, amplifier and electro-responsive device 39, is so adjusted that the rate at which the pressure is applied to the die member 2 is no greater than that rate which intercepts the working curve c (Figure 2) for the temperature to which the resinous material is heated. It will be understood that the different forms of resinous material require different maximum temperatures in order to be rendered workable, so that as this temperature is increased for a given material, the rate of applying the pressure can be increased in a degree determined by the slope of the line c. However, it will be noted that the stress-detecting system is functionally independent of the pressure and temperature requirements of the resinous material, since its only purpose is to register or indicate strain within the material. Consequently, the same apparatus and adjustments thereof may be used even though the character of the resinous material is changed, because the apparatus determines solely the position of the pressure dwells and the length of time of these dwells regardless of the maximum pressure which is continually applied to the material.

In Figure 4 I have shown a modified arrangement in which the dies are made of glass instead of metal, and the fluid motor 28 is positioned at the bottom of the press to move the die portion 2 upwardly against the stationary die member 3. The glass dies may be formed with optically perfect curves similar to the metal dies. Inasmuch as the glass dies, as well as the resinous lens, are of a transparent character it is possible to position the light source and its polarizer on the opposite side of the combined die structure from the analyzer and the light-sensitive device.

The preferred resins as explained hereinbefore have optical sensitivities many times greater than that of glass so that any molecular change in the resin which produces optical distortion is more readily indicated by the light-sensitive device and in much greater degree than similar changes in the glass. Thus the different molecular structures of the two substances and particularly the optical effects of strain produced therein as the result of the applied pressure automatically differentiate themselves in their response to the light which reaches the light-sensitive device. Consequently, even though the light passes through both the glass and resin bodies, any strain imposed by the applied pressure and indicated by the light-sensitive device will represent for all practical purposes, changes in the molecular structure only of the resin.

It will be understood that I desire to comprehend within my invention such modifications as come within the scope of the claims and the invention.

Having thus fully described my invention, what I claim as new and desire to secure by Letters Patent, is:

1. In the fabrication of lenses, the method of pressing a heated blank of resinous material to lens shape, passing polarized light through the blank during the pressing operation to detect optical stress within the material as the result of the pressing operation, and limiting the rate at which the pressure is applied to an amount such as to produce no greater than the slightest amount of strain indicated by a predetermined alteration of the light caused by the stress within the pressed material.

2. In the fabrication of lenses, the method which compresses heating a blank of resinous material to its softening temperature passing polarized light through the blank during the pressing operation to detect optical stress within the material as the result of the pressing operation, applying increasing amounts of pressure with intervening dwell periods at which the pressure is maintained constant, the lengths and positions of the dwell periods in the pressure schedule being determined by the instantaneous permissible strain in the material which causes a measurable alteration of the light passing through the material.

3. In the fabrication of lenses, the method of pressing a heated blank of resinous material to lens shape, passing polarized light through the blank during the pressing operation to detect optical stress within the material as the result of the pressing operation, and controlling the applied pressure in accordance with the alteration of light caused by the stresses within the pressed material.

4. In the fabrication of lenses, the method of simultaneously heating and pressing a blank of resinous material to lens shape, transmitting polarized light through the blank during the pressing operation to detect optical stresses within the material, and causing a dwell in the application of pressure beginning at the instant of time when the stress becomes sufficient to cause optical strain and continuing over a period of time determined by the alteration of the transmitted light caused by the stress within the resinous material.

5. In apparatus for forming lenses of resinous material, the combination of a pair of pressing dies adapted to receive a blank of resinous material in between the dies, and means including a light source for automatically controlling the amount of pressure applied to the dies in accordance with the stresses in the material in order to obtain an optically strain-free lens.

6. In apparatus for forming strainless lenses of resinous material, the combination of a pair of pressing dies adapted to receive a heated blank of resinous material in between the dies, means for detecting optical strain in said material during the pressing operation, and means for controlling the amount of pressure applied to said dies in accordance with the amount of optical strain within said material.

7. In apparatus for forming lenses of resinous material, the combination of a pair of pressing dies adapted to receive a blank of resinous material in between the dies, means for heating the dies, means for transmitting polarized light through said blank, and means for receiving the transmitted light and for controlling the amount of pressure applied to said dies in accordance with the quantity of received light in order to obtain an optically strain-free lens.

8. In apparatus for forming strainless lenses of resinous material, the combination of a pair of pressing dies adapted to receive a blank of resinous material in between the dies, means for heating the dies and blank, means for transmitting polarized light through the blank, and means including a light-sensitive device responsive to the transmitted light for controlling the amount of pressure applied to said dies in order to obtain an optically strain-free lens.

9. In apparatus for forming strainless lenses of resinous material, the combination of a pair of pressing dies adapted to receive a heated blank of resinous material in between the dies, means for detecting stress in said material during the pressing operation, and means including a source of polarized light on one side of the blank and a device which responds to polarized light on the other side of the blank for controlling the amount of pressure applied to said dies in accordance with the amount of optical strain.

10. In apparatus for forming strainless lenses of resinous material, the combination of a pair of metal pressing dies adapted to receive a heated blank of resinous material in between the dies, means including a source of polarized light on one side of the blank and a light analyzer, and a light-responsive device on the other side for controlling the amount of pressure applied to said dies in order to obtain an optically strain-free lens.

11. In apparatus for forming strainless lenses of resinous material, the combination of a pair of glass pressing dies adapted to receive a heated blank of resinous material in between the dies, means for transmitting polarized light through the dies and blank, and means for receiving the transmitted light and for controlling the rate of pressure applied to the dies in accordance with the difference between the transmitted and received light in order to obtain an optically strain-free lens.

12. In the art of molding transparent resinous material, the steps of simultaneously subjecting the material to pressure and to polarized light, and controlling the pressure applied to the material in accordance with the quantity of light which passes through the material.

13. In the art of molding transparent resinous material, the steps of simultaneously subjecting the material to pressure and to polarized light, receiving the light after passing through the material in a photoelectric tube, and controlling the pressure applied to the material in accordance with the quantity of light received by said tube.

14. In the fabrication of lenses, the method of pressing a heated blank of resinous materi[al] to lens shape, measuring the strain in the blan[k] by means of a strain-measuring polarized ligh[t] apparatus, and automatically reducing the rat[e] at which pressure is applied to the blank whe[n] the rate has been indicated by said apparatus t[o] be excessive.

CHARLES V. SMITH.